(12) United States Patent
Yeh (10) Patent No.: US 7,264,523 B2
(45) Date of Patent: Sep. 4, 2007

(54) SLIDER

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 209 days.

(21) Appl. No.: 11/103,861

(22) Filed: Apr. 12, 2005

(65) Prior Publication Data

US 2005/0272323 A1 Dec. 8, 2005

Related U.S. Application Data

(63) Continuation-in-part of application No. 10/797,094, filed on Mar. 11, 2004, now Pat. No. 6,988,920, and a continuation-in-part of application No. 10/386,634, filed on Mar. 13, 2003, now Pat. No. 6,955,576.

(51) Int. Cl.
*B63B 1/00* (2006.01)

(52) U.S. Cl. .......................................... 441/65; 441/74

(58) Field of Classification Search .................... None
See application file for complete search history.

(56) References Cited

U.S. PATENT DOCUMENTS

| | | | | |
|---|---|---|---|---|
| 4,850,913 A | * | 7/1989 | Szabad, Jr. | 441/65 |
| 6,955,576 B2 | * | 10/2005 | Yeh | 441/65 |
| 2003/0224675 A1 | * | 12/2003 | Yeh | 441/65 |

* cited by examiner

*Primary Examiner*—Lars A. Olson
(74) *Attorney, Agent, or Firm*—Rosenberg, Klein & Lee (57) ABSTRACT

This invention relates to a slider, which comprises a polyethylene foam skin, a laminated plastic film and a plastic sheet. The polyethylene foam skin has a density in a range of 1.5 to 12 PCF and a thickness in a range of 1 to 6 mm. The laminated plastic film is heat bonded to a top surface of the polyethylene foam skin entirely and the laminated plastic film has a thickness in range of 0.03 to 0.3 mm. The plastic sheet is heat bonded to a bottom of the polyethylene foam skin entirely and the plastic sheet has a thickness in range of 0.3 to 2 mm. In addition, the laminated plastic film is formed with depressions on both surfaces and the depressions are distributed over the both surfaces of the laminated plastic film.

5 Claims, 8 Drawing Sheets

SLIDER

CROSS REFERENCE TO RELATED APPLICATION

This application is a continuation-in-part application of U.S. application Ser. No. 10/797,094, filed Mar. 11, 2004 now U.S. Pat. No. 6,988,920, and also is a continuation-in-part application of U.S. application Ser. No. 10/386,634 filed, Mar. 13, 2003 now U.S. Pat. No. 6,955,576.

TECHNICAL FIELD

This invention relates generally to a slider, which is provided for being as sports and recreational equipment, such as snow, grass or sand sliders/sleds and sports mats as well.

BACKGROUND OF THE INVENTION

A conventional slider/sled is generally made of a foam board with a top skin, a bottom skin and steerable/gripping accessories thereon that makes the slider/sled heavy to transport and to carry. Another conventional slider/sled, namely a simple slider/sled, is made of a foam skin with gripping through holes thereon or is made of a foam skin bonded with wearable bottom skin and gripping holes thereon that indeed improves the weight and transport of the previous slider/sled.

However, patterns printed on the surfaces of the foregoing sliders/sleds are easily worn off after frequent uses of the sliders/sleds and it is also known that ultraviolet, moisture and dirt damage the structure of the foam materials of the sliders/sleds that reduces the lives of the sliders/sleds. Therefore, the sliders/sleds having enduring patterns and structures are in great demand.

SUMMARY OF INVENTION

The primary objective of the present invention is to provide a slider with lightweight and strong structure.

Another objective of the invention is to provide a laminated layer for a slider and the laminated layer comprises a foam skin and an enduring patterned plastic film.

In one embodiment, the slider of the present invention comprises a polyethylene foam skin, a laminated plastic film and a plastic sheet. The polyethylene foam skin has a density in a range of 1.5 to 12 PCF and a thickness in a range of 1 to 6 mm. The laminated plastic film is heat bonded to a top surface of the polyethylene foam skin entirely and the laminated plastic film has a thickness in range of 0.03 to 0.3 mm. The plastic sheet is heat bonded to a bottom of the polyethylene foam skin entirely and the plastic sheet has a thickness in range of 0.3 to 2 mm. In addition, the laminated plastic film is formed with depressions on both surfaces and the depressions are distributed over the both surfaces of the laminated plastic film. Alternatively, the polyethylene foam skin can be a multilayer foam skin and the laminated plastic film can be a patterned plastic film.

In another embodiment, a laminated layer for a slider of the present invention comprises a polyethylene foam skin and a laminated plastic film. The polyethylene foam skin has a density in a range of 1.5 to 12 PCF and a thickness in a range of 1 to 6 mm. The laminated plastic film is heat bonded to a top surface of the polyethylene foam skin entirely and the laminated plastic film has a thickness in range of 0.03 to 0.3 mm. In addition, the laminated plastic film is formed with depressions on both surfaces and the depressions are distributed over the both surfaces of the laminated plastic film. Alternatively, the laminated plastic film is a patterned plastic film, which comprises an inner film and an outer film printed with patterns.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
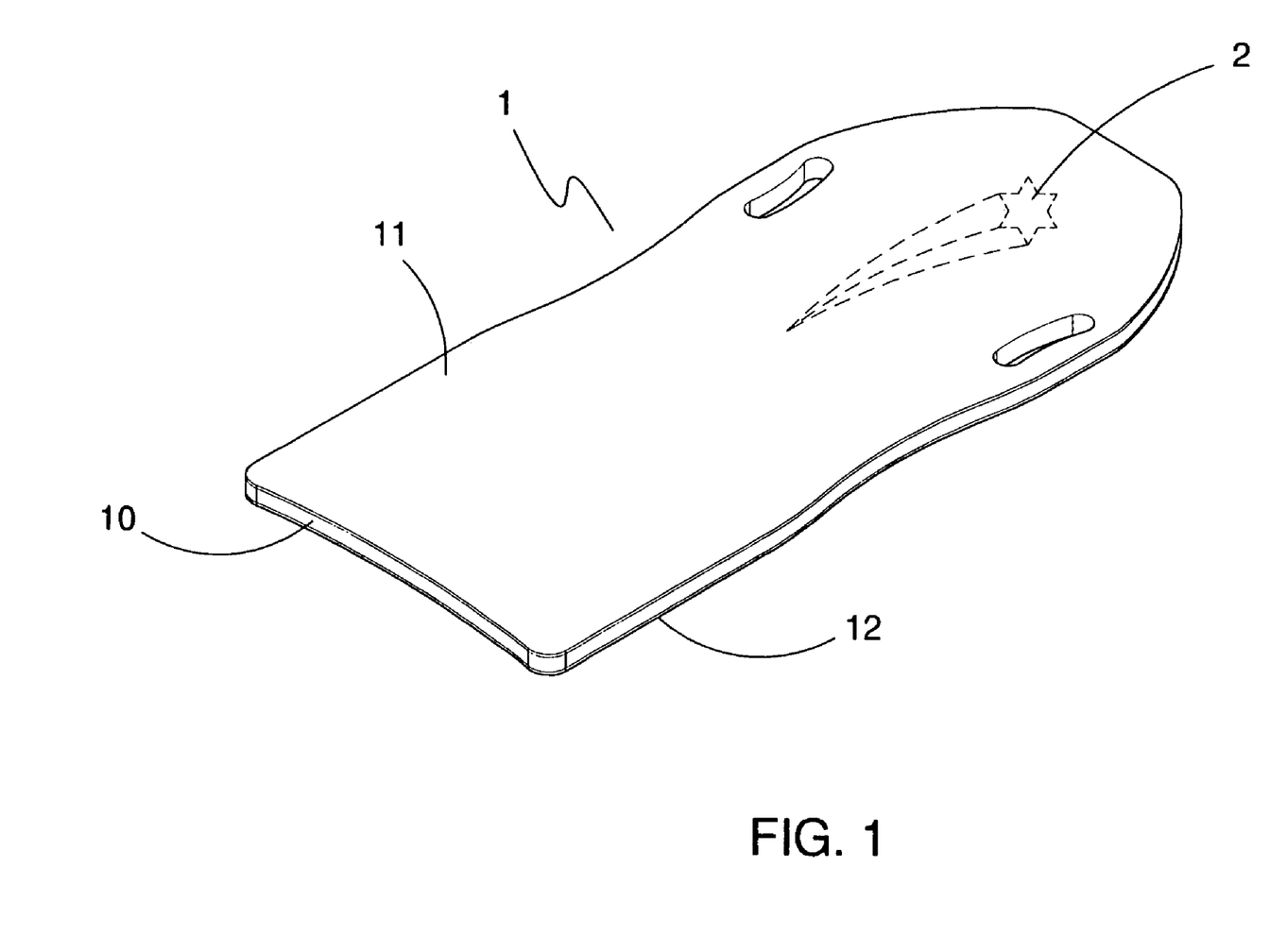
FIG. 1 is a perspective view of a first embodiment of the present invention.
Figure 2:
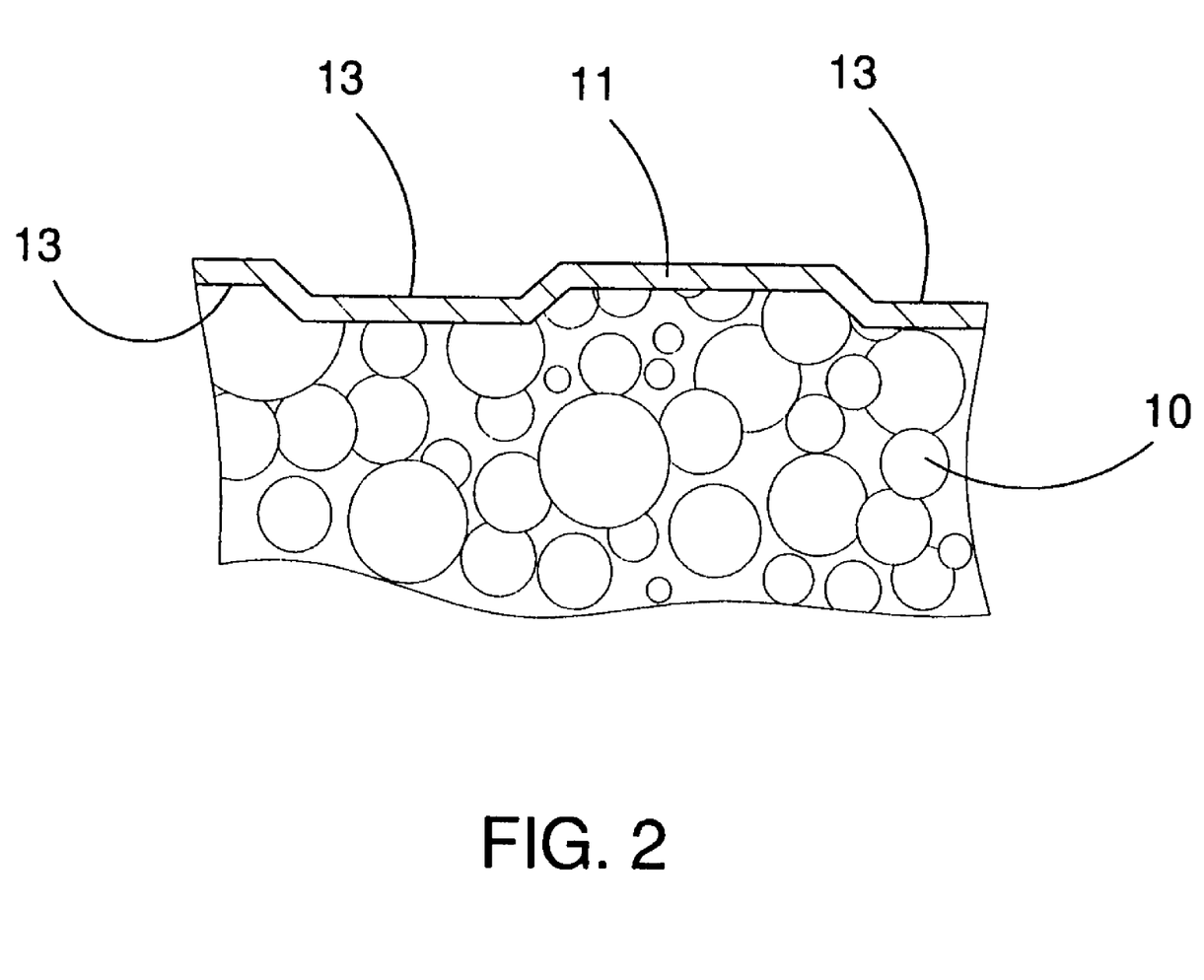
FIG. 2 is a regionally enlarged cross sectional view of the first embodiment of the present invention.
Figure 3:
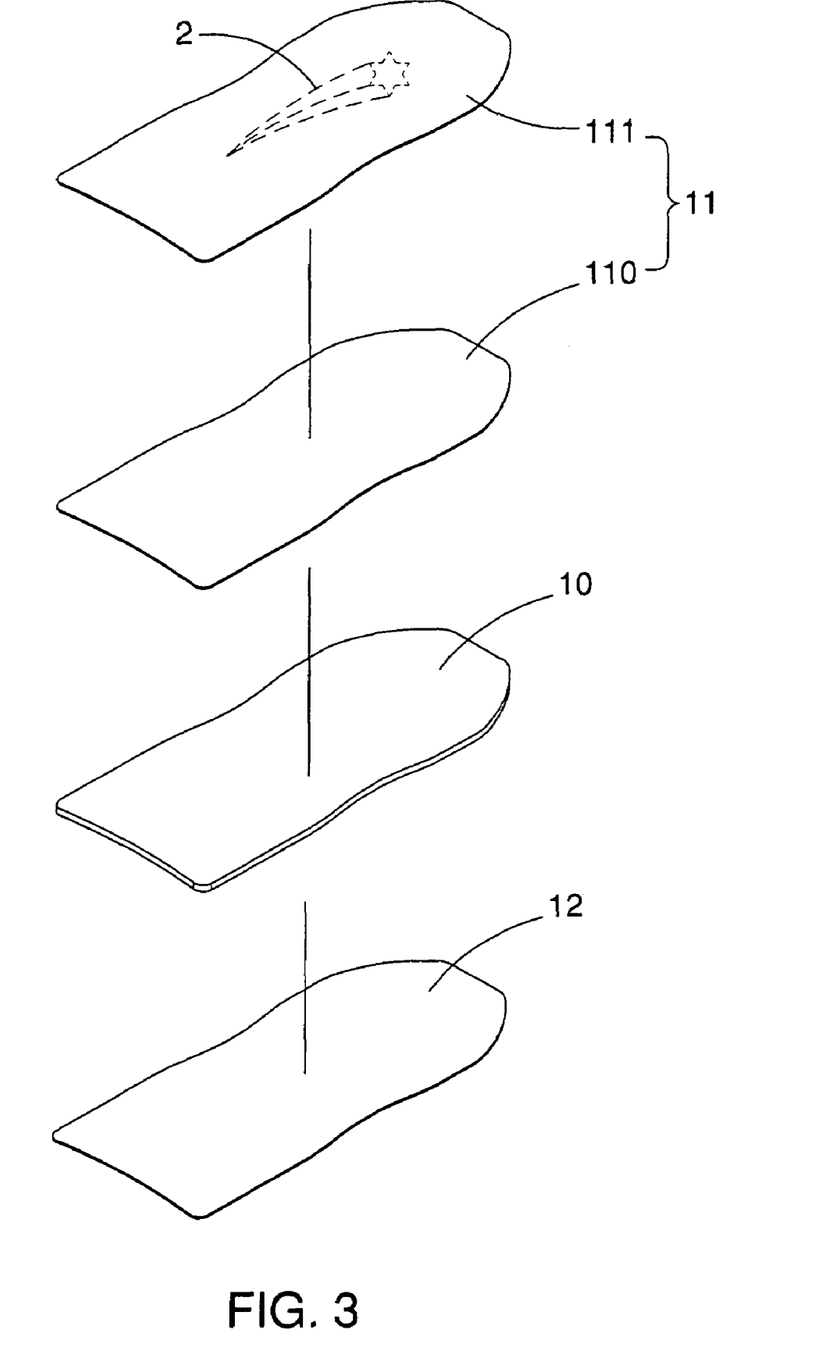
FIG. 3 is an exploded prospective view of the first embodiment of the present invention.

A slider 1 according to a first embodiment of the present invention is shown in FIGS. 1 to 3. The slider 1 of the first embodiment comprises a polyethylene foam skin 10, a laminated plastic film 11 and a plastic sheet 12. The polyethylene foam skin 10 has a density in a range of 1.5 to 12 PCF and a thickness in a range of 1 to 6 mm. The laminated plastic film 11 is heat bonded to a top surface of the polyethylene foam skin 10 entirely and has a thickness in range of 0.03 to 0.3 mm. The plastic sheet 12 is heat bonded to a bottom of the polyethylene foam skin 10 entirely and has a thickness in range of 0.3 to 2 mm. In addition, the laminated plastic film 11 is formed with depressions 13 on both surfaces and the depressions 13 are distributed over the both surfaces of the laminated plastic film 11. More importantly, the depressions 13 of the laminated plastic film 11 facing to the polyethylene foam skin 10 are also heat bonded to the polyethylene foam skin 10, so as to enhance the bonding between the laminated plastic film 11 and the polyethylene foam skin 10, as shown in FIG. 2.

In the first embodiment of the present invention, the laminated plastic film 11 is a patterned film and comprises an inner film 110 and an outer film 111 as shown in FIG. 3. The inner film 110 is heat bonded to the polyethylene foam skin 10 entirely and has a thickness in range of 0.01 to 0.15 mm. Furthermore, the outer film 111 has a surface printed with patterns 2 thereon and the surface is heat bonded to the inner film 110 entirely, so as to cover the printed patterns 2, which are visible from outside of the outer film 111. Preferably, the outer film 111 has a thickness in range of 0.02 to 0.15 mm. Alternatively, the patterns 2 can also be printed an outer surface of the inner film 110 and the patterned outer surface of the inner film 110 is heat bonded to the outer film 111.

Figure 4:
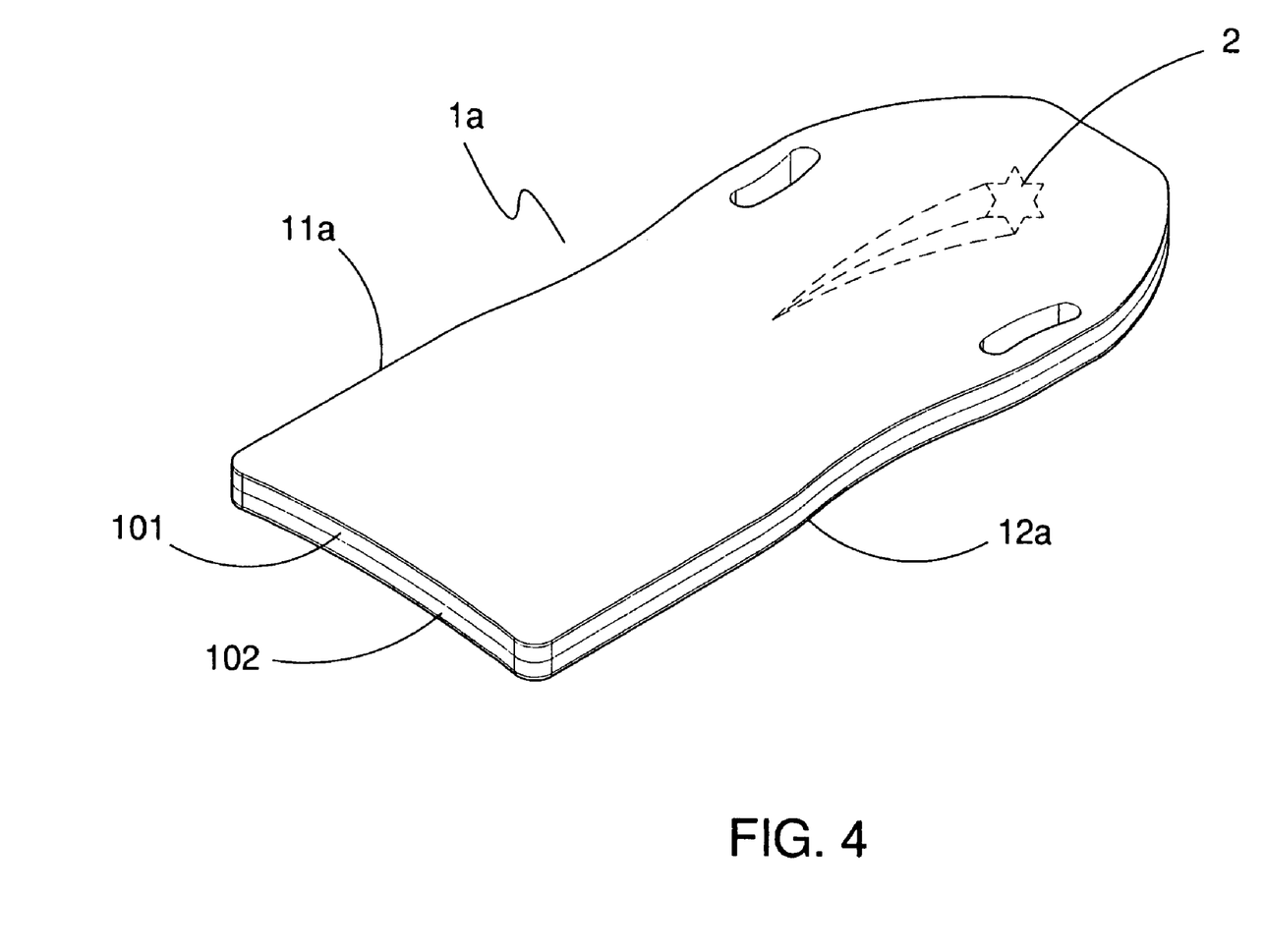
FIG. 4 is a perspective view of a second embodiment of the present invention.
Figure 5:
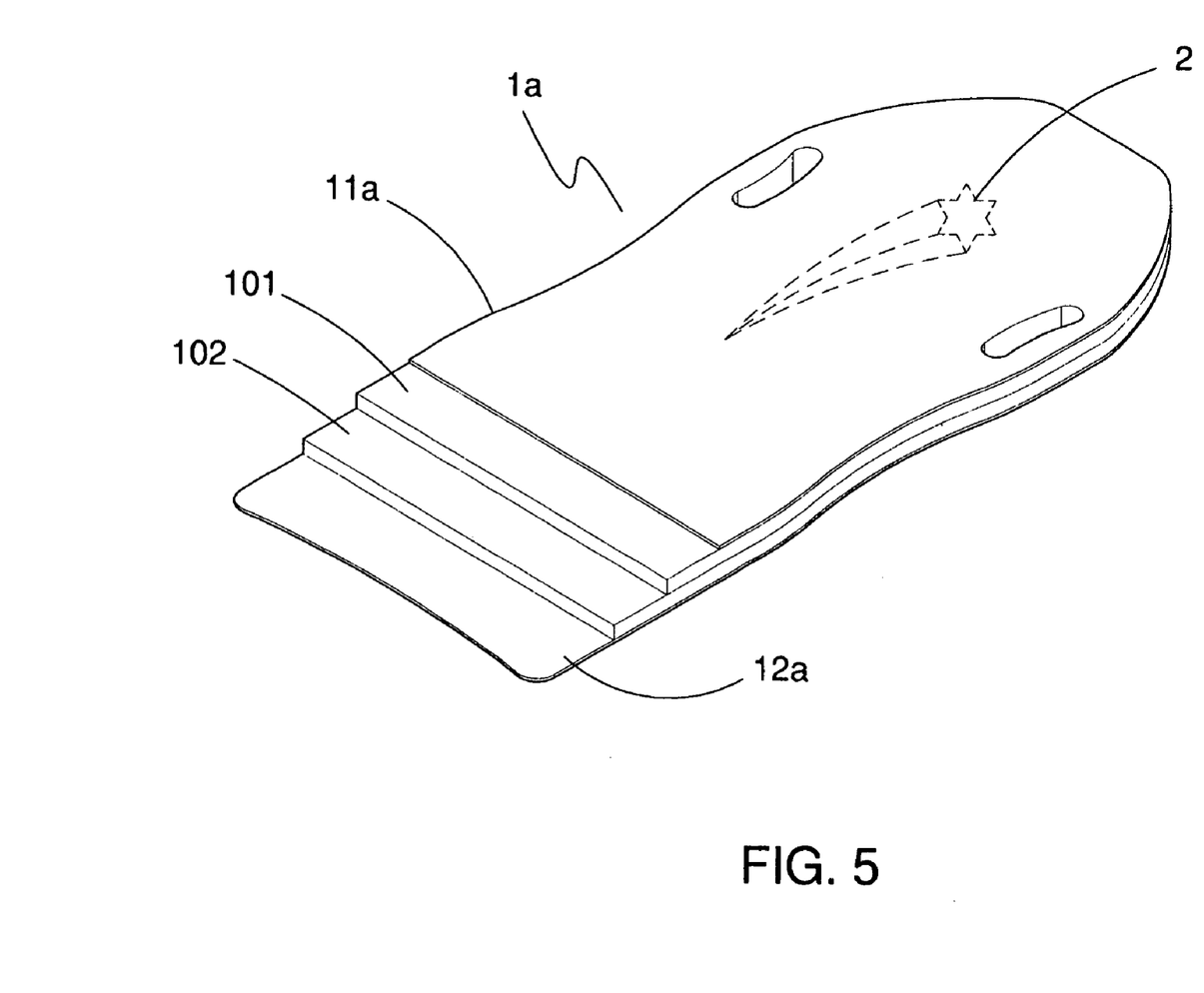
FIG. 5 is a cross sectional view of the second embodiment of the present invention.

FIG. 4 and FIG. 5 show a slider 1a as a second embodiment of the present invention. The slider 1a comprises a first polyethylene foam skin 101, a second polyethylene foam skin 102, a laminated plastic film 11a, and a plastic sheet 12a. Similarly, the first polyethylene foam skin 101 and the second polyethylene foam skin 102 of the slider 1a are the same as the polyethylene foam skin 10 of the slider 1 of the first embodiment, and have a density in a range of 1.5 to 12 PCF and a thickness in a range of 1 to 6 mm respectively. The second polyethylene foam skin 102 is heat bonded to the first polyethylene foam skin entirely 101.

In addition, the laminated plastic film 11a is heat bonded to the first polyethylene foam skin 101 entirely and has a thickness in range of 0.03 to 0.3 mm. The plastic sheet 12a is heat bonded to the second polyethylene foam skin 102 entirely and has a thickness in range of 0.3 to 2 mm, similarly to the laminated plastic film 11 and the plastic sheet 12 of the first embodiment. The laminated plastic film 11a of the second embodiment also is a patterned film as the foregoing laminated plastic film 11 of the first embodiment; therefore, the detailed description of the laminated plastic film 11a is omitted.

Figure 6:
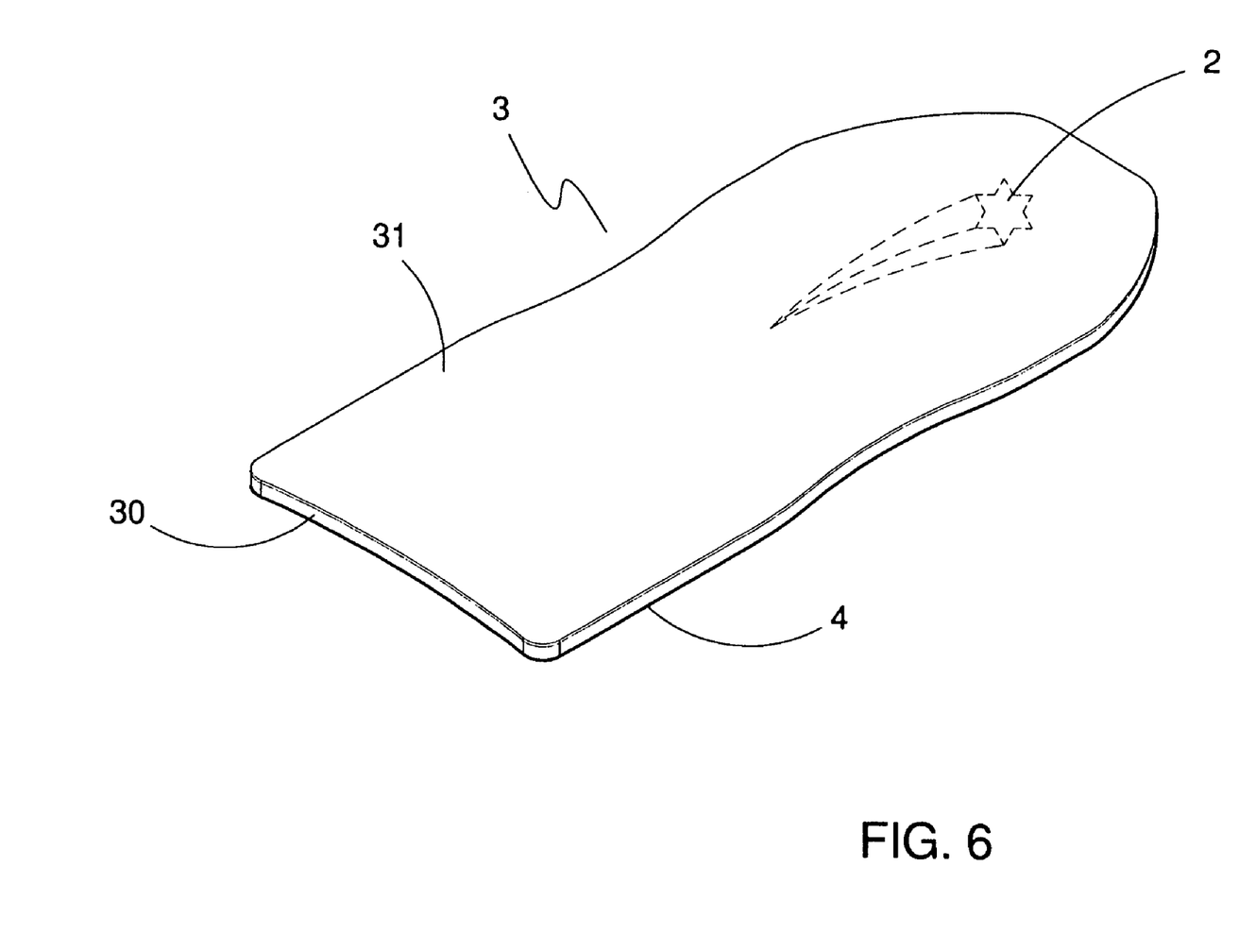
FIG. 6 is a perspective view of a third embodiment of the present invention.

FIG. 6 shows a laminated layer 3 as a third embodiment of the present invention. The laminated layer 3 is provided for heat bonding to a slider, such as foregoing described sliders made of foam skins or other sliders made of foam boards, so as to be a top layer of the slider. The laminated layer 3 of the third embodiment comprises a polyethylene foam skin 30 and a laminated plastic film 31. Similarly to the first and second embodiments of the present invention, the polyethylene foam skin 30 has a density in a range of 1.5 to 12 PCF and a thickness in a range of 1 to 6 mm. The laminated plastic film 31 is heat bonded to a top surface of the polyethylene foam skin 30 entirely and has a thickness in range of 0.03 to 0.3 mm. The laminated plastic film 31 also is formed with depressions on both surfaces and the depressions are distributed over the both surfaces of the laminated plastic film 31. Furthermore, the laminated plastic film 31 also is a patterned plastic film, which has patterns 2 formed between an inner film and an outer film of the laminated plastic film 31.

More importantly, the laminated layer 3 of the third embodiment further comprises a bonding film 4, which is heat bonded to a bottom surface of the polyethylene foam skin 30 entirely. In operation, the bonding film 4 is preferably extruded and coated onto the polyethylene foam skin 30. Furthermore, the bonding film 4 is a copolymer, which mainly assists the laminated layer 3 to be heat bonded to a top of a slider, which is made of polystyrene foam board/core or other non-polyethylene foam board/core without adhesives. Therefore, the laminated layer 3 with the bonding film 4 of the present invention can be applied to various foam materials of sliders. In addition, the bonding film 4 has a thickness in range of 0.01 to 0.1 mm, preferably in range of 0.03 to 0.05 mm.

Figure 7:
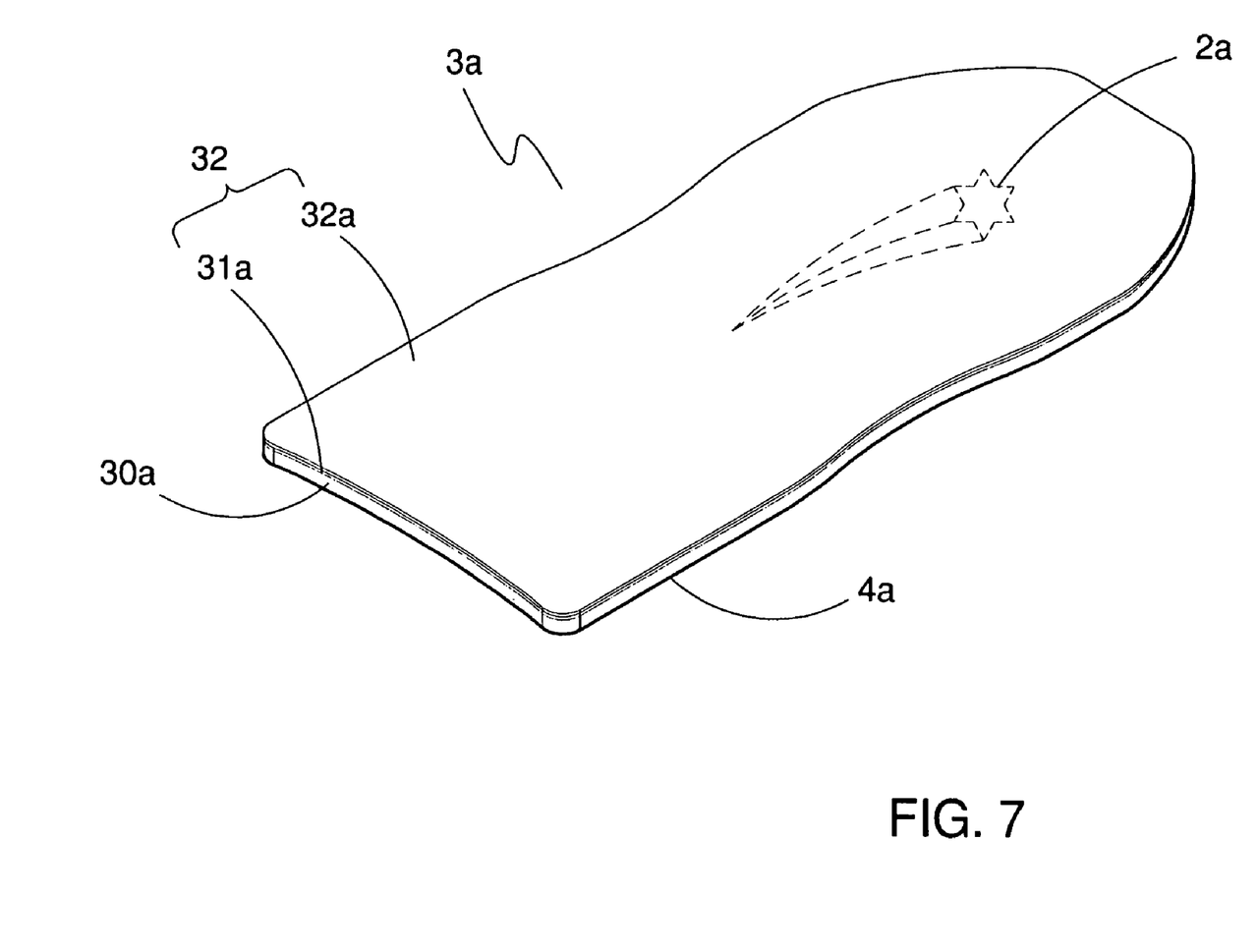
FIG. 7 is a perspective view of a fourth embodiment of the present invention.

FIG. 7 shows a laminated layer 3a as a fourth embodiment of the present invention. Similarly to the third embodiment, the laminated layer 3a of the fourth embodiment is provided for being heat bonded to a bottom of a slider, which is made of foam materials, such as foam skins or boards/cores, so as to be a bottom layer of the slider. The laminated layer 3a mainly comprises a polyethylene foam skin 30a and a laminated plastic sheet 32. The polyethylene foam skin 30a preferably has a density in a range of 1.5 to 12 PCF and a thickness in a range of 1 to 6 mm, preferably a range of 4 to 8 PCF in the density and a range of 1 to 4 mm in the thickness. The laminated plastic sheet 32 is heat bonded to a top surface of the polyethylene foam skin 30a entirely and has a thickness in range of 0.3 to 2 mm.

In addition, the laminated plastic sheet 32 comprises a laminated plastic film 31a and a plate 32a. The laminated plastic film 31a is heat bonded to the top surface of the polyethylene foam skin 30a and is a patterned plastic film, which has patterns 2a formed between an inner film and an outer film of the laminated plastic film 31 as described in the above embodiments. Furthermore, the plate 32a is heat bonded to the laminated plastic film 31a and has a thickness in range of 0.3 to 2 mm. The plate 32a is made of transparent materials; therefore, the patterns 2a are visible from outside of the plate 32a.

Similarly to the third embodiment, the laminated layer 3a further comprises a bonding film 4a, which is heat bonded to a bottom surface of the polyethylene foam skin 30a entirely. The bonding film 4a also is a copolymer, which assists the laminated layer 3a to be heat bonded to the slider, which is made of polystyrene foam board/core or other non-polyethylene foam board/core without adhesives. In addition, the bonding film 4a has a thickness in range of 0.01 to 0.1 mm, preferably in range of 0.03 to 0.05 mm.

Figure 8:
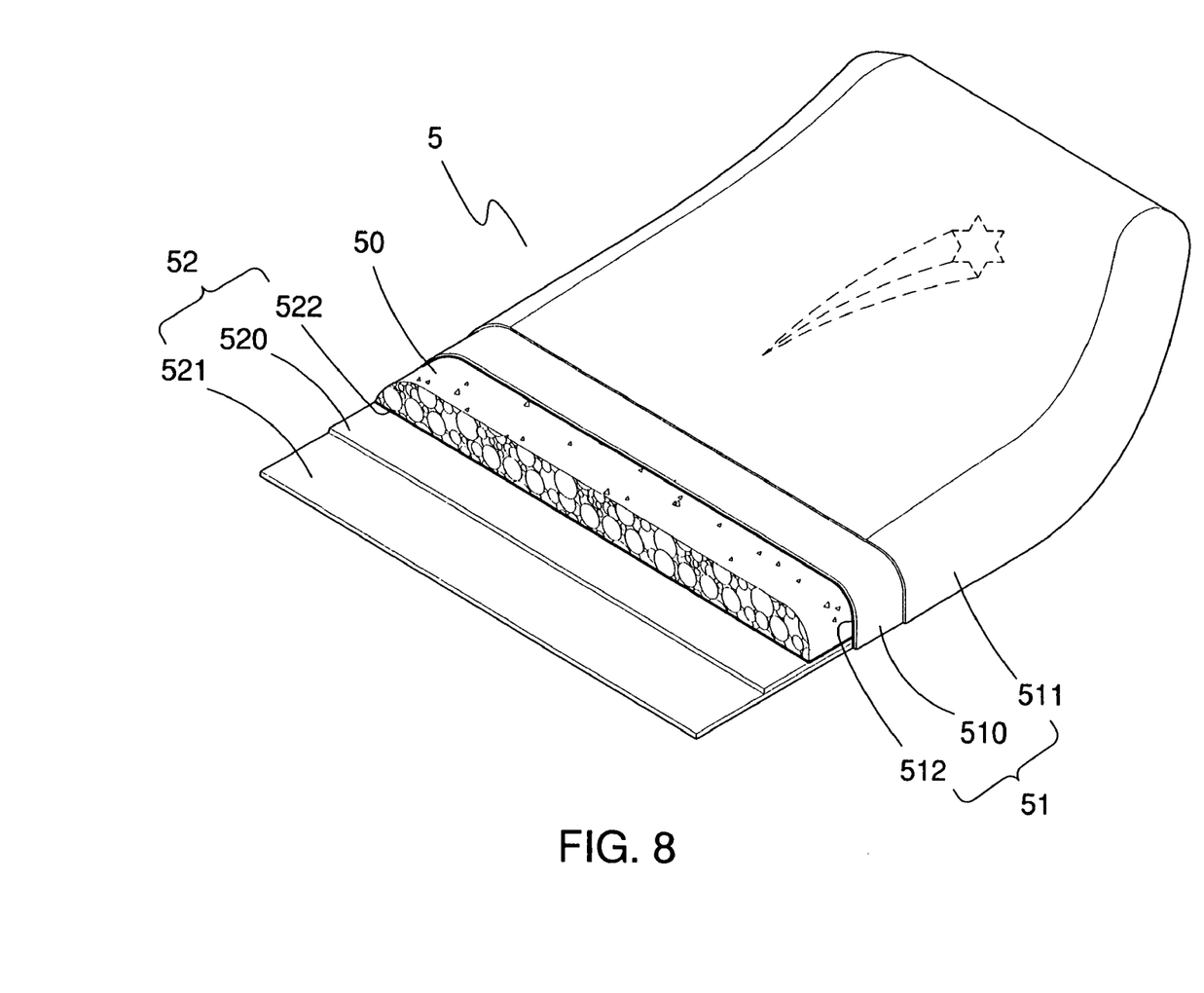
FIG. 8 is a cross sectional view of a fifth embodiment of the present invention.

FIG. 8 shows a fifth embodiment of the present invention and a further application of the third and fourth embodiments as well. The fifth embodiment shows a slider 5, which comprises a foam core 50, a laminated top layer 51 and a laminated bottom layer 52. The foam core 50 of the fifth embodiment is made of a non-polyethylene foam board, such as a polystyrene or polypropylene foam board, and the foam core 50 has a top surface and a bottom surface. Preferably, the foam core 50 has a density in the range of 0.8 to 8 PCF. In addition, the laminated top layer 51 is heat bonded to the top surface of the foam core 50 entirely and comprises a first polyethylene foam skin 510, a laminated plastic film 511 and a first bonding film 512. The laminated bottom layer 52 is heat bonded to the bottom surface of the foam core 50 entirely and comprises a second polyethylene foam skin 520, a laminated plastic sheet 521 and a second bonding film 522.

Substantially, the laminated top layer 51 of the fifth embodiment is the laminated layer 3 of the third embodiment, and the laminated bottom layer 52 is the laminated layer 3a of the fourth embodiment. In addition, both the laminated plastic film 511 of the laminated top layer 51 and the laminated plastic sheet 521 of the laminated bottom layer 52 are patterned. Furthermore, the first bonding film 512 and the second bonding film 522 are provided for assisting the laminated top layer 51 and the laminated bottom layer 52 respectively to be heat bonded to the foam core 50, which is made of the non-polyethylene foam board/core, as described in the foregoing embodiments.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

I claim:
1. A slider comprising:
   a first plastic film having an inner surface, said first plastic film has a thickness from 0.02 mm to 0.3 mm;
   a polyethylene foaming skin comprising an upper surface and a lower surface, said upper surface is bonded with said first plastic film, said polyethylene foaming skin has a foaming value from 1.9 PCF to 6 PCF; and a second plastic film having an inner surface bonded with said lower surface of said polyethylene foaming skin, said second plastic film has a thickness from 0.3 mm to 1.5 mm, wherein said first plastic film has concaves on both sides, said concaves on an inner side of said first plastic film are united with said polyethylene foaming skin, thereby increasing bonding surfaces between said first plastic film and said polyethylene foaming skin.

2. The slider of claim 1, wherein said first plastic film comprises:

an outer film comprising an inner surface having a pattern thereon; and an inner film comprising an outer surface bonded with said inner surface of said outer film, and an inner surface bonded with said upper surface of said polyethylene foaming skin.

3. The slider of claim 1, wherein said second plastic film comprises:

an outer film comprising an inner surface having a pattern thereon; and an inner film comprising an outer surface bonded with said inner surface of said outer film, and an inner surface bonded with said lower surface of said polyethylene foaming skin.

4. A slider comprising:

a first plastic film having an inner surface;

a polyethylene foaming skin comprising an upper surface and a lower surface, said upper surface is bonded with said first plastic film, said polyethylene foaming skin has a foaming value from 1.9 PCF to 6 PCF: and a second plastic film having an inner surface bonded with said lower surface of said polyethylene foaming skin, said second plastic film has a thickness from 0.3 mm to 1.5 mm, wherein said first plastic film comprising:

an outer film comprising an inner surface having a pattern thereon, said outer film is pervious to light, said outer film has a thickness from 0.02 mm to 0.15 mm; and an inner film comprising an outer surface and an inner surface, said outer surface of said inner film is bonded with said inner surface of said outer film, said inner surface of said inner film is bonded with said upper surface of said polyethylene foaming skin, said inner film has a thickness from 0.01 mm to 0.15 mm.

5. A slider comprising:

a first plastic film having an inner surface, said first plastic film has a thickness from 0.02 mm to 0.3 mm;

a polyethylene foaming skin comprising an upper surface and a lower surface, said upper surface is bonded with said first plastic film, said polyethylene foaming skin has a foaming value from 1.9 PCF to 6 PCF; and a second plastic film having an inner surface bonded with said lower surface of said polyethylene foaming skin, wherein said second plastic film comprising:

an outer film comprising an inner surface having a pattern thereon, said outer film is pervious to light; and an inner film comprising an outer surface and an inner surface, said outer surface of said inner film is bonded with said inner surface of said outer film, said inner surface of said inner film is bonded with said polyethylene foaming skin, said second plastic film has a thickness from 0.3 mm to 1.5 mm.

* * * * *